(12) United States Patent
Harris

(10) Patent No.: US 7,899,726 B2
(45) Date of Patent: Mar. 1, 2011

(54) METHOD AND APPARATUS FOR OPTION FILTERING

(75) Inventor: Stephen Harris, St. Louis, MO (US)

(73) Assignee: Reuters SA, Geneva (CH)

(*) Notice: Subject to any disclaimer, the term of this patent is extended or adjusted under 35 U.S.C. 154(b) by 225 days.

(21) Appl. No.: 11/503,198

(22) Filed: Aug. 11, 2006

(65) Prior Publication Data

US 2008/0040290 A1 Feb. 14, 2008

(51) Int. Cl.
*G06Q 40/00* (2006.01)

(52) U.S. Cl. .............................. 705/36; 705/35; 705/37; 705/26; 705/44; 463/10; 455/403

(58) Field of Classification Search .............. 705/36 R, 705/44, 37; 455/403
See application file for complete search history.

(56) References Cited

U.S. PATENT DOCUMENTS

| | | | | |
|---|---|---|---|---|
| 5,136,501 | A * | 8/1992 | Silverman et al. ............. | 705/37 |
| 5,517,406 | A * | 5/1996 | Harris et al. .................. | 705/30 |
| 5,867,799 | A * | 2/1999 | Lang et al. .................... | 1/1 |
| 5,918,218 | A * | 6/1999 | Harris et al. .................. | 705/37 |
| 5,924,083 | A * | 7/1999 | Silverman et al. ............. | 705/37 |
| 7,136,834 | B1 * | 11/2006 | Merrin et al. ................. | 705/37 |
| 7,356,498 | B2 * | 4/2008 | Kaminsky et al. ............. | 705/37 |
| 7,496,534 | B2 * | 2/2009 | Olsen et al. ................... | 705/37 |
| 7,636,683 | B1 * | 12/2009 | Mills et al. .................... | 705/37 |
| 2002/0138390 | A1 * | 9/2002 | May ............................. | 705/37 |
| 2003/0041036 | A1 * | 2/2003 | Molinari et al. ............... | 705/77 |
| 2003/0065608 | A1 * | 4/2003 | Cutler .......................... | 705/37 |
| 2003/0069834 | A1 * | 4/2003 | Cutler .......................... | 705/37 |
| 2003/0083973 | A1 * | 5/2003 | Horsfall ....................... | 705/37 |
| 2004/0078317 | A1 * | 4/2004 | Allen et al. ................... | 705/37 |
| 2004/0193524 | A1 * | 9/2004 | Almeida et al. ............... | 705/36 |
| 2004/0254872 | A1 * | 12/2004 | Grzebeta et al. .............. | 705/36 |
| 2004/0254877 | A1 * | 12/2004 | Buckwalter et al. ........... | 705/37 |
| 2005/0119956 | A1 * | 6/2005 | Soumokil ..................... | 705/34 |
| 2005/0187855 | A1 * | 8/2005 | Brennan et al. ............... | 705/37 |
| 2007/0005481 | A1 * | 1/2007 | Kedia et al. ................... | 705/37 |
| 2007/0022054 | A1 * | 1/2007 | Tumen ......................... | 705/45 |
| 2009/0006266 | A1 * | 1/2009 | Hanson et al. ................ | 705/80 |

OTHER PUBLICATIONS

Bull Bear Band, http://www.bullbearband.com, 2002 (BullBear).*
The Ultimate Trade Setup using Bollinger Bands, Erik L. Gebhard, May 2004(Ultimate).*
Tom Aspray, Fine Tuning Option Entries and Exits with Trading Bands, 2000: vol. 9, No. 5 (CRBTrader).*

* cited by examiner

*Primary Examiner*—Ella Colbert
*Assistant Examiner*—Chika Ojiaku
(74) *Attorney, Agent, or Firm*—Buckley, Maschoff & Talwalkar LLC

(57) ABSTRACT

According to some embodiments, systems, methods, apparatus, computer program code, and means for filtering options data include receiving options feed data including a first set of options feed data having a changed quote, identifying, from the first set of options feed data, a second set of the options feed data meeting at least a first filter criteria, producing a filtered options feed by filtering out the second set of the options feed data, and disseminating the filtered options feed.

17 Claims, 6 Drawing Sheets

| Time | Last Sale | Vol. | Bid | Bid Size | Bid Exchange | Ask | Ask Size | Ask Exchange | Sequence # |
|---|---|---|---|---|---|---|---|---|---|
| 2:50:12 PM | | | 0.90 | 794 | X | 0.95 | 1038 | X | 24326 |
| 2:50:09 PM | | | 0.90 | 278 | P | 0.95 | 558 | P | 24323 |
| 2:50:03 PM | | | 0.90 | 1085 | I | 0.95 | 765 | I | 24322 |
| 2:50:00 PM | | | 0.90 | 490 | B | 0.95 | 411 | B | 24315 |
| 2:49:57 PM | | | 0.90 | 1085 | I | 0.95 | 1072 | I | 24313 |
| 2:49:54 PM | | | 0.90 | 1198 | CO | 0.95 | 1479 | CO | 24311 |
| 2:49:54 PM | | | 0.90 | 200 | A | 0.95 | 466 | A | 24310 |
| 2:49:54 PM | | | 0.90 | 397 | P | 0.95 | 533 | P | 24309 |
| 2:49:54 PM | | | 0.90 | 622 | P | 0.95 | 533 | P | 24308 |
| 2:49:48 PM | | | 0.90 | 794 | X | 0.95 | 1038 | X | 24305 |
| 2:49:45 PM | | | 0.90 | 1085 | I | 0.95 | 1060 | I | 24304 |
| 2:49:45 PM | | | 0.90 | 364 | P | 0.95 | 533 | P | 24303 |
| 2:49:42 PM | | | 0.90 | 860 | CO | 0.95 | 1479 | CO | 24298 |
| 2:49:42 PM | | | 0.90 | 710 | CO | 0.95 | 1479 | CO | 24297 |
| 2:49:42 PM | | | 0.90 | 1075 | I | 0.95 | 855 | I | 24294 |
| 2:49:42 PM | | | 0.90 | 139 | P | 0.95 | 533 | P | 24293 |
| 2:49:42 PM | | | 0.90 | 480 | CO | 0.95 | 1479 | CO | 24292 |
| 2:49:42 PM | | | 0.90 | 370 | CO | 0.95 | 1603 | CO | 24291 |
| 2:49:42 PM | | | 0.90 | 37 | CO | 0.95 | 1603 | CO | 24290 |
| 2:49:42 PM | | | 0.90 | 64 | P | 0.95 | 533 | P | 24289 |
| 2:49:42 PM | | | 0.90 | 536 | X | 0.95 | 1038 | X | 24287 |
| 2:49:42 PM | | | 0.90 | 100 | A | 0.95 | 466 | A | 24286 |
| 2:49:39 PM | | | 0.90 | 461 | B | 0.95 | 611 | B | 24280 |
| 2:49:39 PM | | | 0.85 | 7585 | I | 0.95 | 875 | I | 24279 |
| 2:49:39 PM | | | 0.90 | 161 | B | 0.95 | 611 | B | 24276 |
| 2:49:39 PM | | | 0.90 | 300 | X | 0.95 | 1038 | X | 24275 |
| 2:49:39 PM | | | 0.90 | 51 | B | 0.95 | 611 | B | 24274 |
| 2:49:39 PM | | | 0.85 | 7585 | I | 0.95 | 1532 | I | 24265 |
| 2:49:39 PM | | | 0.85 | 8413 | CO | 0.95 | 2010 | I | 24264 |
| 2:49:39 PM | | | 0.85 | 8413 | CO | 0.95 | 1943 | CO | 24263 |
| 2:49:39 PM | | | 0.85 | 641 | A | 0.95 | 466 | A | 24261 |
| 2:49:39 PM | | | 0.85 | 1054 | B | 0.95 | 611 | B | 24259 |
| 2:49:24 PM | | | 0.85 | 7585 | I | 0.95 | 2010 | I | 24257 |
| 2:49:24 PM | | | 0.85 | 8413 | CO | 0.95 | 2839 | CO | 24256 |
| 2:49:24 PM | | | 0.85 | 7813 | CO | 0.95 | 2839 | CO | 24255 |

FIG. 2

METHOD AND APPARATUS FOR OPTION FILTERING

BACKGROUND

Options are a popular investment option for many classes of investors. An option is essentially a contract giving a buyer the right, but not the obligation, to buy or sell shares of an underlying security at a specific price for a specific time. In the U.S., for example, a number of exchanges facilitate the trading of options, including the Chicago Board Options Exchange (the "CBOE"), the American Stock Exchange (the "AMEX"), the International Securities Exchange (the "ISE") the Boston Options Exchange (the "BSE"), the New York Stock Exchange (through their Archipelago subsidiary) (the "NYSE Arca"), and the Philadelphia Stock Exchange (the "PHLX").

In the U.S., data from all of the options exchanges are consolidated into a single data feed—the "OPRA" feed. The OPRA feed is a near real-time feed of all options quotes throughout the trading day. Each exchange may publish quotes as different aspects of orders change throughout the day. Increasingly, the exchanges have been providing a greater number of quotes (on the theory that more price points are better for investors). As competition between the exchanges increase, the exchanges have been providing a greater number of quotes (on the theory that more price points are better for investors).

Unfortunately, this has lead to a huge increase in data that is disseminated to investors. For example, over the last several years, the volume of quotes has been increasing at over 100% each year. Last year, there were about 50,000 quotes/second in peak periods during the trading day. This year, there are between 100,000 and 140,000 quotes/second during peak periods. Recently, new peak volumes have exceeded 163,000 messages per second from OPRA. OPRA also announced that they expect their message rate to hit 456,000 by mid-2007. This huge increase in data makes it difficult for traders to identify changes of interest, and also presents a problem for trading platform throughput (as many of these quotes may be associated with enhanced feed data, such as news and securities information related to each underlyer and option).

BRIEF DESCRIPTION OF THE DRAWINGS

FIG. 2 illustrates typical data provided for a typical set of options.

SUMMARY OF THE INVENTION

Figure 1:
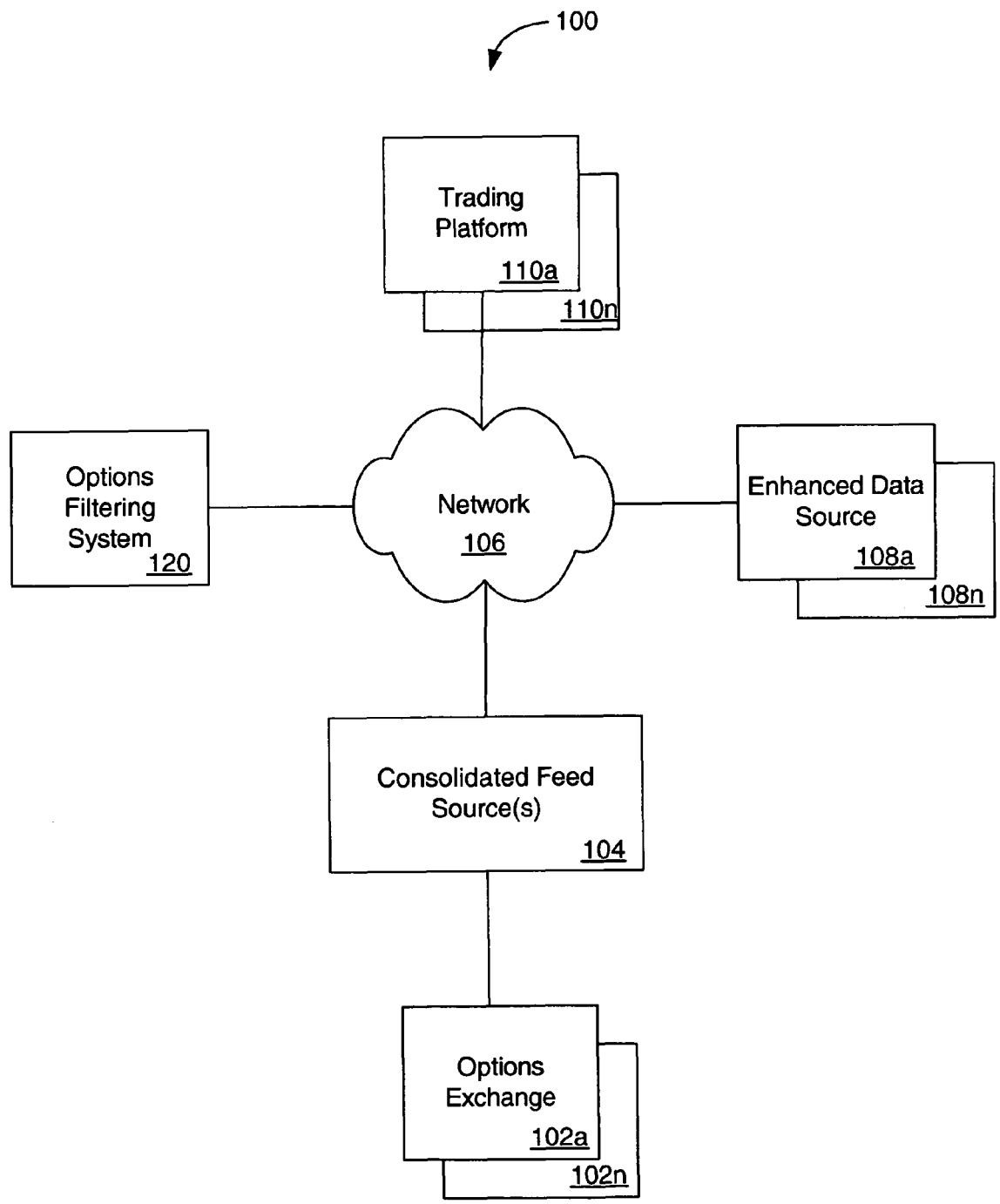
FIG. 1 illustrates a block diagram of a system pursuant to some embodiments.

According to some embodiments, systems, methods, apparatus, computer program code, and means for filtering options data include receiving options feed data including a first set of options feed data having a changed quote, identifying, from the first set of options feed data, a second set of the options feed data meeting at least a first filter criteria, producing a filtered options feed by filtering out the second set of the options feed data, and disseminating the filtered options feed.

In some embodiments, the first set of the options feed data includes options feed data having a changed quote with no change in price. In some embodiments, the at least first filter criteria includes at least one size threshold. In some embodiments, multiple thresholds are established based on the previous size of the quote and based on the price increase or decrease from the previous size.

A technical content of some embodiments of the invention is improved throughput and processing efficiency. For example, in some embodiments, options feed sizes may be reduced by a substantial amount without loss of relevant information. With this and other advantages and features that will become hereinafter apparent, a more complete understanding of the nature of the invention can be obtained by referring to the following detailed description and to the drawings appended hereto.

DETAILED DESCRIPTION

Applicant has recognized a need for improved options feed processing. Pursuant to some embodiments, options feed data are filtered to remove or suppress certain quote data to improve bandwidth, information dissemination, and to facilitate improved use of feed data.

For consistency and ease of exposition, a number of terms are used herein to describe features of some embodiments. For example, the term "option" is used to refer to a contract whereby one party (the "holder" or "buyer") has the right but not the obligation to exercise a feature of the contract (the "option") on or before a future date (the "exercise date" or "expiry"). The other party (the "writer" or "seller") has the obligation to honor the specified feature of the contract. Since the option gives the buyer a right and the seller an obligation, the buyer has received something of value. The amount the buyer pays the seller for the option is called the "option premium". Typically, the buyer has the right but not the obligation to purchase (a "call option") or sell (a "put option") a specified amount of a security within a specified time period.

For simplicity, but not by way of limitation, the options and options exchanges described herein are described in examples related to trade on U.S. options exchanges. Those skilled in the art will appreciate that features of embodiments of the present invention may be used on other exchanges as well.

As used herein, the term "quote" or "market quote" refers to a quotation of the current best bid/ask prices for an option in the marketplace.

As used herein, "OPRA" refers to the Options Price Reporting Authority, a U.S. national market system plan that governs the process by which options market data are collected from participant exchanges, consolidated, and disseminated. Consolidated data help ensure that broker-dealers, markets, and investors have the best prices available for an option, from all markets trading that option class. Again, the reference to U.S. market data is not intended to be limiting; embodiments of the present invention may be used with other market data systems.

Features of some embodiments will now be described by reference to FIG. 1, where a system 100 for filtering options is shown. As depicted, system 100 includes options feed data generated by one or more options exchanges 102*a-n* and routed over one or more networks 106 to a number of entities and devices, including an options filtering system 120, and one or more trading platforms 110*a-n*. In some embodiments, the network 106 may also be in communication with one or more enhanced data sources 108a-n.

In some embodiments, a consolidated feed source (or sources) 104 receives option data from options exchanges 102a-n and consolidates the feed data into a single consolidated feed. For example, in the U.S., consolidated feed source 104 may be the Options Price Reporting Authority ("OPRA"), which currently receives and consolidates feed data from exchanges such as AMEX, BSE, CBOE, ISE, NYSA Arca and PHLX. Those skilled in the art will appreciate that data from other exchanges and other consolidators may also be used with embodiments of the present invention.

The feed data is disseminated to a number of trading entities and platforms such as trading platforms 110a-n. Pursuant to some embodiments, feed data is first routed to options filtering system 120 for filtering pursuant to the present invention. In some embodiments, options filtering system 120 is configured to operate as one or more servers operated to disseminate quote data. For example, in some embodiments, a data provider or other entity may operate a "ticker plant" including a number of servers configured to deliver streams of quote data, including options quotes. Options filtering system 120 may be one or more servers in this ticker plant. In this manner, options filtering system 120 may be operated to filter quote data before feeds are disseminated to a number of users, thereby reducing bandwidth needed to deliver the outgoing feed to a large number of customers. In some embodiments, options filter system 120 may be configured to operate as a Web server receiving unfiltered options feed data from consolidated feed source 104 and generating filtered feed data for dissemination to one or more trading platforms 10a-n.

In some embodiments, options filtering system 120 may be operated by, or on behalf of, a data provider such as the assignee of the present application, Reuters Ltd. In some embodiments, different traders, operating different trading platforms 110, may specify different filtering criteria and conditions to receive filtered feeds matching their particular trading preferences. In some embodiments, options filtering system 120 may also receive enhanced data from one or more enhanced data sources 108a-n. For example, filtered options data generated by options filtering system 120 may be appended with news and market information relevant to particular options. As a specific example, options quote data involving IBM stock may be appended with relevant news and market information about IBM. By filtering the quote feed, the bandwidth required to disseminate both the quote feed and any associated enhanced data is reduced.

As used herein, devices (e.g., such as trading platform 110, options filtering system 120, etc.) may exchange information, for example, via a communication network 106 such as a Local Area Network (LAN), a Metropolitan Area Network (MAN), a Wide Area Network (WAN), a proprietary network, a Public Switched Telephone Network (PSTN), a Wireless Application Protocol (WAP) network, a Bluetooth network, a wireless LAN network (e.g., in accordance with an 802.11 standard), and/or an Internet Protocol (IP) network such as the Internet, an intranet, or an extranet. Note that devices may communicate via one or more such communication networks.

Although a single options filtering system 120 is shown in FIG. 1, any number of options filtering systems 120 may be included in the system 100. Similarly, any number of trading platforms 110, consolidated feed sources 104, exchanges 102 and enhanced data sources 108 may be included according to embodiments of the present invention. That is, the options filtering system 120 may receive, store, and manipulate data feeds from a number of sources, and may transmit filtered options data to a number of users.

According to some embodiments, the options filtering system 120 may process unfiltered options feed data to create filtered options feed data for use by users operating trading platforms 110a-n. For example, options filtering system 120 may receive real-time (or current) options feed data from a consolidated feed source (such as OPRA) over network 106. The options filtering system 120 may then apply one or more filter conditions to the feed to produce one or more filtered feeds. For example, as will be discussed further below, the options filtering system 120 may identify those quotes that have changed in size but not in price and then identify the specific changes in size to filter out changes that are below (or above) one or more set thresholds. For example, an operator of the options filtering system 120 (or individual traders) may determine that options having no change in price, but a large increase in quote size should be included in the filtered feed, but that options having a small increase in quote size should be filtered out of the feed. Other filtering techniques will be described further below in conjunction with FIGS. 3-5. In this manner, the huge volume of quote data received from consolidated feed source 104 (and/or directly from options exchanges 102a-n) may be viewed and analyzed in a more accurate and efficient manner by traders operating trading platforms 110a-n.

FIG. 2 provides a chart 200 illustrating a small portion of options quote data for options based on a specific equity underlyer (here, the example data is for options based on GE equities). The chart 200 has been filtered pursuant to some embodiments of the present invention. The chart 200 is presented to provide an illustration of certain quote terms provided in a typical feed from a consolidated feed source 104 and also to show the relative bandwidth savings that can be realized through use of the present invention. As shown, a number of options trade at any given time based on each equity underlyer. Each option has a strike price, a symbol (not shown, but here, the symbol is GE IZ), a bid and an ask price, a current volume, and open interest.

In the example shown in FIG. 2, a number of individual quotes are shown. However, a large number of individual quotes have been suppressed or filtered using features of the present invention. The fact that quotes have been suppressed can be discerned by reviewing the sequence numbers in the right-hand column. As shown, there is a gap in sequence numbers between the quote displayed at the top of the chart (at 2:50:12 PM) and the second displayed quote from the top (at 2:50:09 PM). Apparently, two quotes were suppressed. As will be discussed further below, in some embodiments, the quotes may have been suppressed because the change in quote size may have been below a threshold set pursuant to embodiments of the present invention. In the table shown in FIG. 2, approximately 72 quotes were received during the period shown—however, only 35 are displayed. That is, over 50% of the received quotes were filtered out pursuant to the present invention. In this manner, substantial bandwidth savings are realized. Further, traders who need to make trading decisions are presented with a smaller set of data to sort through, allowing improved trading decisions.

Figure 3:
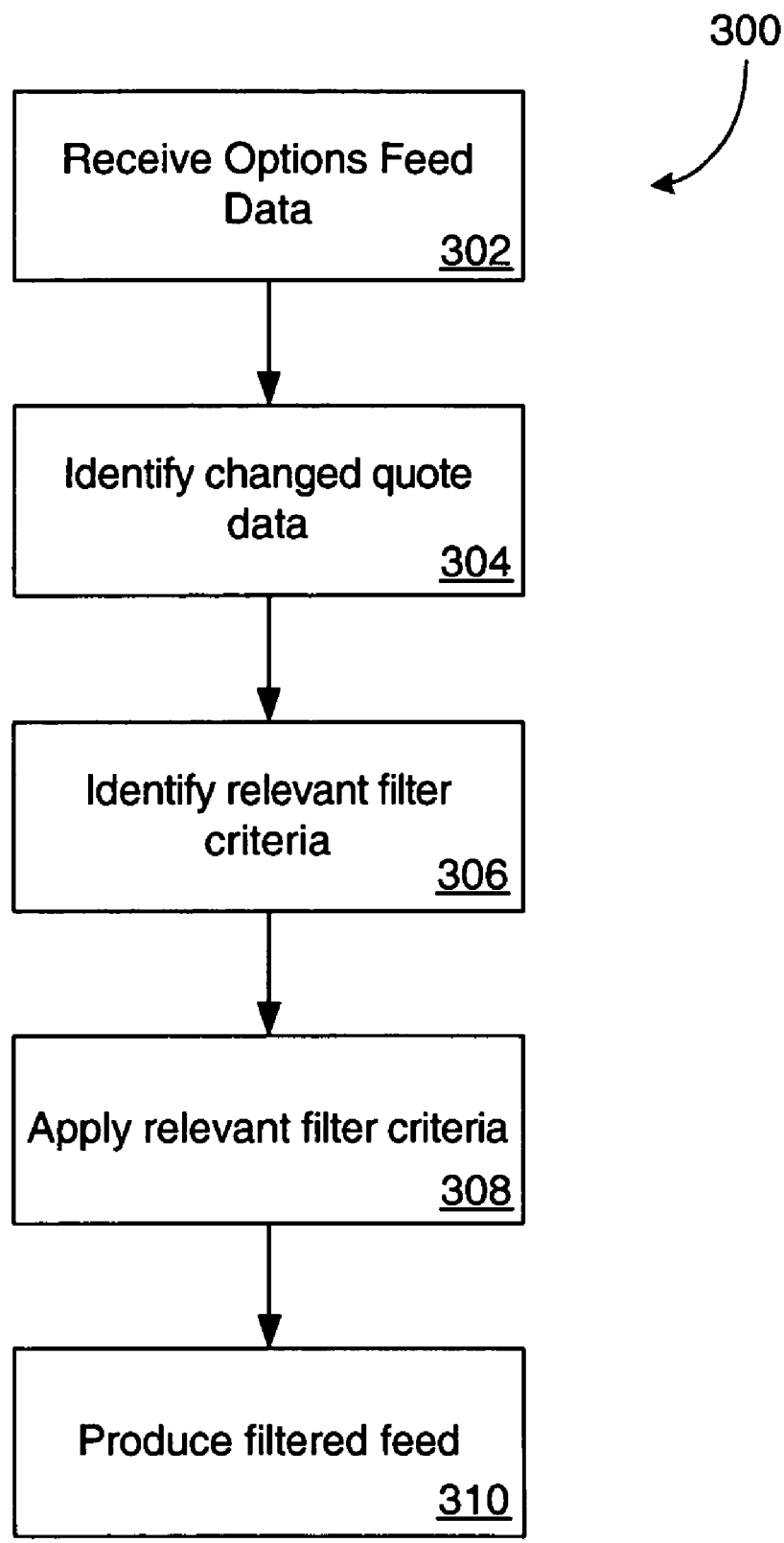
FIG. 3 illustrates an options filtering process pursuant to some embodiments.

FIG. 3 illustrates a process 300 of filtering options data according to some embodiments. The method may be performed, for example, by the options filtering system 120 of FIG. 1. The flow charts described herein do not imply a fixed order to the steps, and embodiments of the present invention may be practiced in any order that is practicable. In some embodiments, the process 300 may be processed continually as new feed data is received from consolidated feed source 104.

Process 300 begins at 302 where options feed data is received. For example, options feed data may be received from one or more consolidated feed sources 104 over network 106. In some embodiments, options feed data may also be received directly from one or more exchanges 102.

Processing continues at 304 where changed quote data in the feed is identified by comparing the current feed with a stored version of a previous feed. In some embodiments, processing at 304 includes identifying quote data which has a change in size but no change in price, although those skilled in the art will appreciate that filtering may be performed which includes identifying selected changes in price as well. Those skilled in the art will appreciate that options feeds generally include only quotes having a change in price or size or both; accordingly, processing at 304 may include simply receiving options feed data.

Processing continues at 306 where relevant filter criteria is identified. In some embodiments, a single set of filter criteria are applied to all feed data. In some embodiments, different criteria may be applied to feeds for different customers (e.g., one trading entity may specify a first set of criteria, while a second trading entity may specify a second set of criteria). The filter criteria may include, for example, quote size thresholds that are applied to the feed data which is identified at 304 as having no change in price, but a change in size.

Once the relevant filter criteria to be applied have been identified, processing continues at 308 where the filter criteria are applied to the feed data. A specific set of filter criteria will be described in more detail below in conjunction with a description of FIG. 5. For example, the filter criteria may be based on a quote's previous size and a change in size from the previous quote. As s specific example, filter criteria may specify that if a quote's previous size was between 10 and 50, and if the current quote has changed by less than 10 (as either an increase in size or a decrease in size), the quote will be filtered out (or suppressed). The relevant filter criteria are applied to all data in the new feed and a filtered feed is produced at 310.

As used herein, the term "filtered feed" generally refers to a feed produced by options filtering system 120 which has a number of options quotes suppressed or filtered out to reduce the volume of quotes that are displayed or disseminated to one or more trading platforms 110a-n. In some embodiments, a number of filtered feeds may be produced and disseminated to different trading platforms 110a-n. In some embodiments, one or more filtered feeds may also be enhanced or associated with data from one or more enhanced data sources 108a-n (e.g., appending market data, news or other information to the quote data in the filtered feed).

Figure 4:
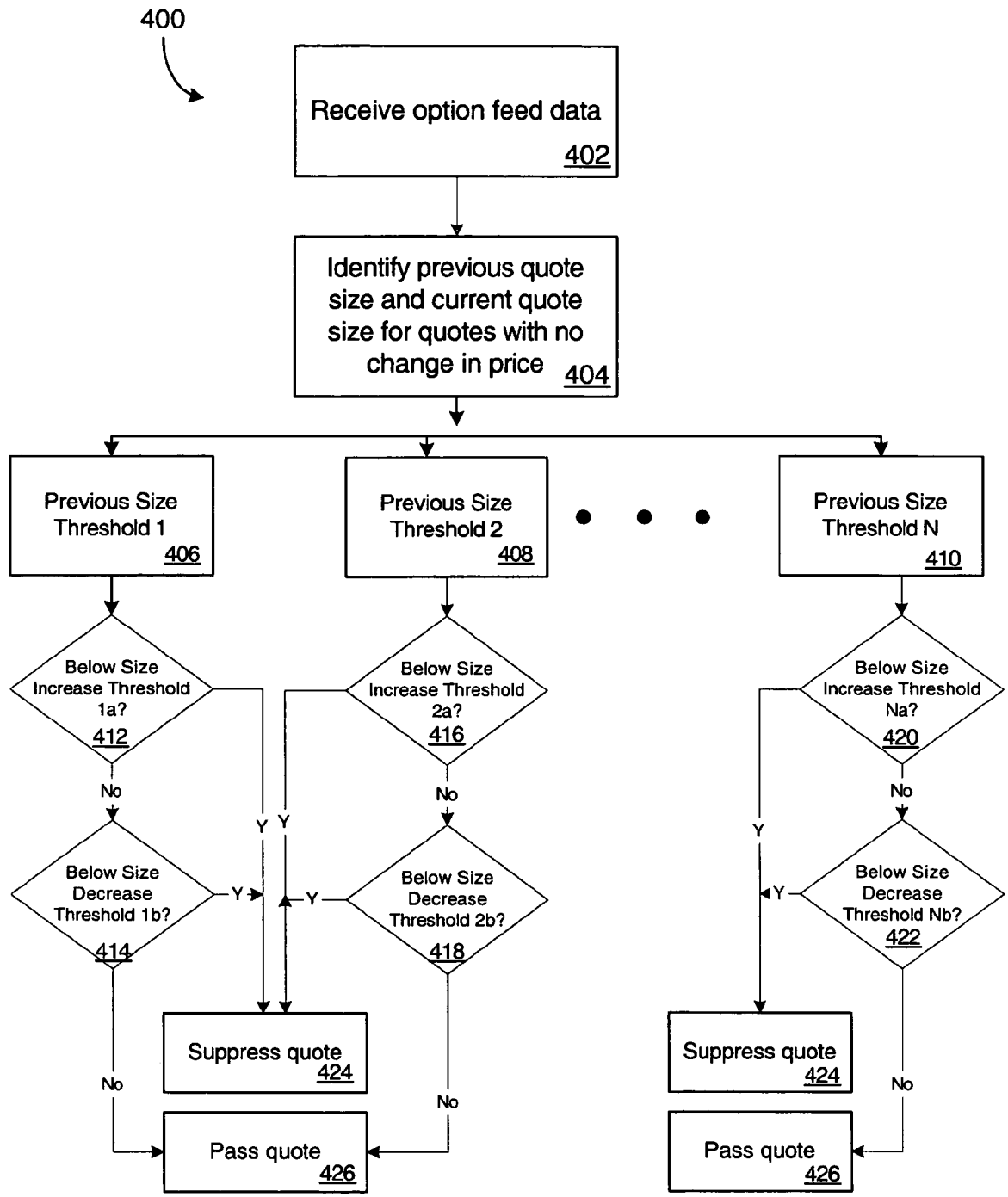
FIG. 4 illustrates a further options filtering process pursuant to some embodiments.

Referring now to FIG. 4, a further process 400 for producing filtered option feeds is shown. Again, process 400 may be performed by, or under the control of, options filtering system 120 based on unfiltered options feed data received from consolidated feed source 104 and/or from one or more options exchanges 102a-n.

Process 400 begins at 402 where unfiltered option feed data is received from consolidated feed source 104 (and/or from one or more options exchanges 102a-n) over network 106. For example, the unfiltered option feed data may be received from the OPRA in a format specified by OPRA.

Processing continues at 404 where options filtering system 120 operates to identify, for each option and quote, a previous quote size and a current quote size for every quote having no change in price. For every quote having no change in price, but a change in quote size, the previous size is categorized into a threshold, shown in FIG. 4 as previous size thresholds 406-410. For example, the size thresholds may be selected to create size bands to identify relevant size change data.

Once the size thresholds or bands are identified, the change in size from the previous quote is identified by applying filter criteria at 412-422. In some embodiments, different size change thresholds are identified for price increases and for price decreases. For example, the importance of size decreases as the quote size increases. If a trader has an order to buy or sell 50 options, it matters little to him when the quote size moves from 100 to 200 or from 200 to 100. However, the trader will be very interested to know when the size moves from 20 to 50 or vice versa.

Pursuant to some embodiments, the direction of the price movement is also a factor in the filtering. If the size increases, it will be of lesser importance than if the size decreases because a decreasing size will be more likely to affect the ability to execute a trade at a given price than will an increasing size because the average trade size is considerably smaller than the average quote size. In general, the thresholds and filtering involve setting size bands that have increasing minimum changes needed to pass the filter as quote sizes increase. The minimum changes are set to different values for increases over the previous size versus decreases over the previous size, with the smaller size limit being used for decreases. The result is a filtered feed that is more relevant to traders and is more easily processed.

Figure 5:
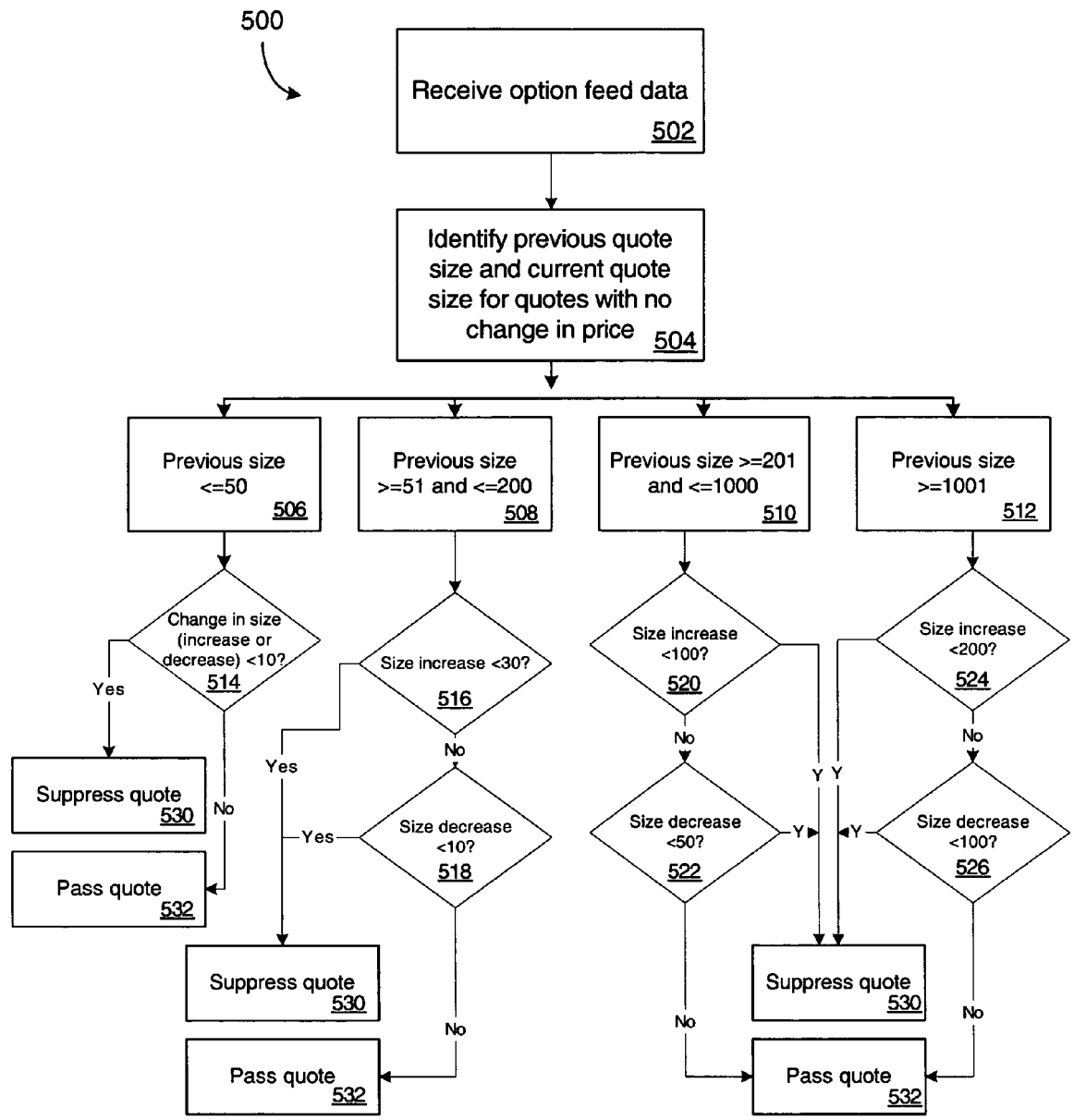
FIG. 5 illustrates a further options filtering process pursuant to some embodiments.

A specific example, illustrating size thresholds is shown in FIG. 5. As shown in FIG. 5, quotes are grouped into four (4) previous size bands: 10-50, 51-200, 201-1000, and sizes of over 1000. Quotes having previous sizes falling into the 10-50 band are suppressed if the change in size is less than 10 (either an increase or decrease). Quotes having previous sizes falling into the 51-200 band are suppressed if there is a size increase of less than 30, and if there is a size decrease of less than 10. Quotes having previous sizes falling into the 201-1000 band are suppressed if there is a size increase of less than 100, and if there is a size decrease of less than 50. Quotes having previous sizes of greater than 1000 are suppressed if there is a size increase of less than 200, and if there is a size decrease of less than 100. Those skilled in the art will appreciate that these size bands and thresholds may be varied based on market conditions and user acceptance. Further, as described above, different size bands and thresholds may be specified by different clients or users to achieve a filtered feed that meets their specific requirements and trading objectives.

Figure 6:
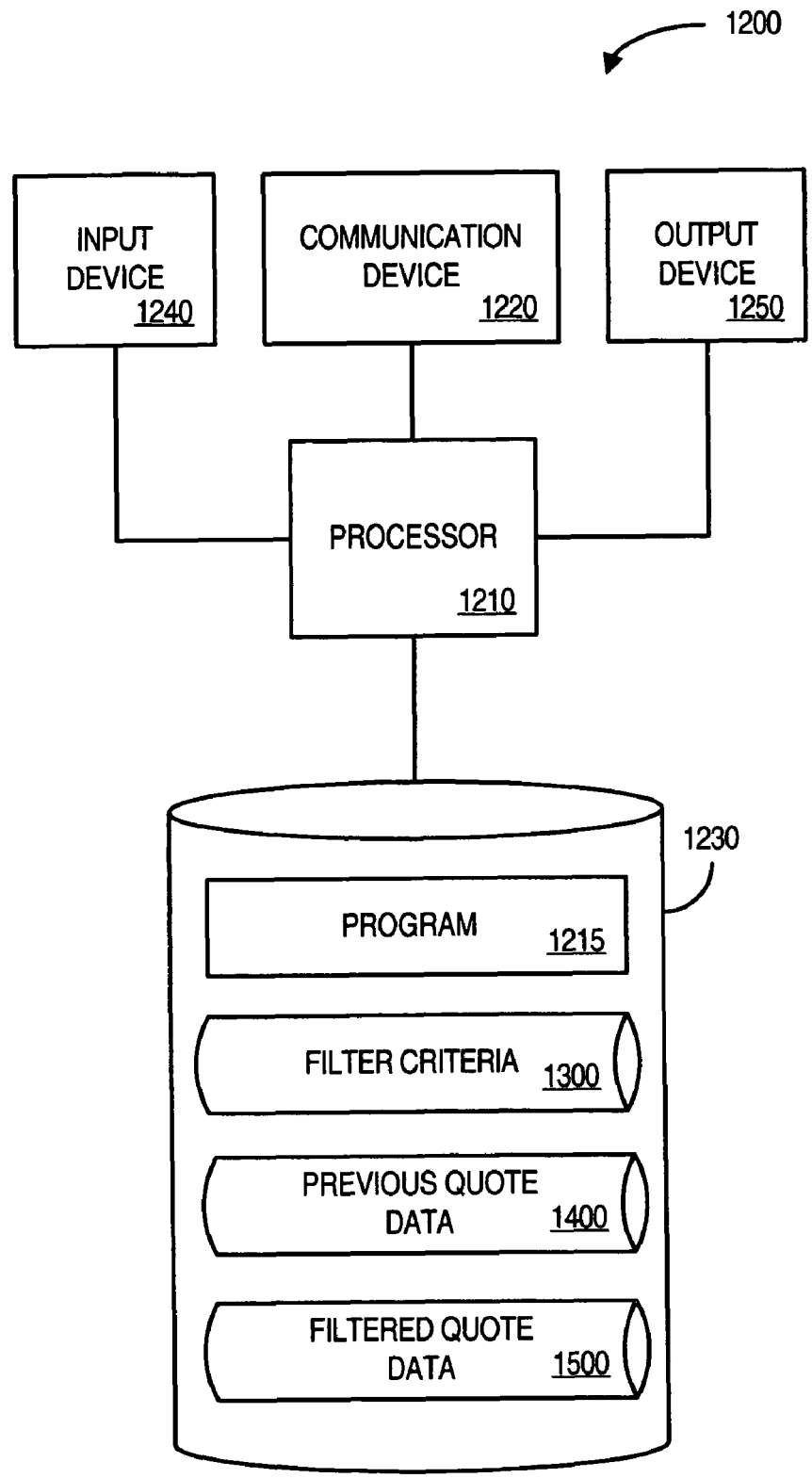
FIG. 6 illustrates an options filtering system pursuant to some embodiments.

FIG. 6 illustrates one embodiment of an options filtering system 1200. The options filtering system 1200, in this illustrative embodiment, comprises a processor 1210, such as one or more INTEL® Pentium® processors, coupled to a communication device 1220 configured to communicate via a communication network such as network 106 of FIG. 1. The communication device 1220 may be used to communicate, for example, with one or more consolidated feed sources 104 (e.g., to receive unfiltered option feed data) and/or trading platforms 110a-n (e.g., to disseminate filtered option feed data and to receive filter criteria). According to one embodiment, the communication device 1220 is also used to communicate with other options filtering systems 1200.

The processor 1210 is also in communication with an input device 1240. The input device 1240 may comprise, for example, a keyboard, a mouse or other pointing device, and/or a microphone. Such an input device 1240 may be used, for example, to enter administrative information and to specify, adjust, or maintain filter criteria. The processor 1210 is also in communication with an output device 1250. The output device 1250 may comprise, for example, a display screen or printer.

The processor 1210 is also in communication with a storage device 1230. The storage device 1230 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

The storage device 1230 stores a program 1215 for controlling the processor 1210. The processor 1210 performs instructions of the program 1215, and thereby operates in accordance with the present invention. For example, the processor 1210 may operate to apply filter criteria to options feed data received from one or more consolidated feed sources 104 and to cause the generation of a filtered options feed for dissemination to one or more trading platforms 110*a-n*.

As used herein, information may be "received" by or "transmitted" to, for example: (i) the options filtering system 1200 from a consolidated feed source 104, one or more options exchanges 102*a-n*, one or more enhanced data sources 108*a-n*, and/or one or more trading platforms 110*a-n*; or (ii) a software application or module within the options filtering system 1200 from another software application, module, or any other source.

As shown in FIG. 6, the storage device 1230 also stores: a filter criteria database 1300, a previous quote database 1400, and a filtered quote database 1500. In some embodiments, the filter criteria database 1300 may include one or more filter criteria (such as the specific filter criteria described above in conjunction with FIG. 5). In some embodiments, different sets of filter criteria for different users or trading systems may be included in database 1500.

In some embodiments, the previous quote database 1400 includes a previous set of unfiltered quote data from consolidated feed source 104 for use in comparing option size filters to a current feed. In some embodiments, filtered quote database 1500 includes filtered or suppressed data resulting from the application of filters to an options data feed received from consolidated feed source 104. Data from filtered quote database 1500 may be disseminated to one or more trading platforms for use by traders.

Although specific hardware and data configurations have been described herein, note that any number of other configurations may be provided in accordance with embodiments of the present invention. The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed:

1. A method for operating an options filtering system, the method comprising:

receiving, by an options filtering system including a server, options feed data including a first set of options feed data having a changed quote size;

identifying, from said first set of options feed data, a plurality of distinct second sets of said options feed data, each of said plurality of said second sets of said options feed data meeting at least a first filter criteria, said at least first filter criteria includes at least one previous quote size threshold and a change from a previous quote filter criteria associated with the at least one previous quote size threshold that is unique to each of said plurality of said second sets of said options feed data;

producing a filtered options feed by applying said at least first filter criteria to each of said plurality of said second sets of said options feed data; and disseminating, from said options filtering system, said filtered options feed.

2. The method of claim 1, wherein said first set of said options feed data includes options feed data having a changed quote size with no change in price.

3. The method of claim 1, wherein said change from a previous quote filter criteria includes at least one of one or more quote size increase thresholds and one or more quote size decrease thresholds.

4. The method of claim 3, wherein each of said quote size decrease thresholds are tighter than each of said quote size increase thresholds.

5. The method of claim 1, further comprising:

augmenting at least a portion of said filtered options feed with enhanced data from at least one data source.

6. The method of claim 5, wherein said enhanced data includes at least one of a news item, a government filing, chart data, and company data.

7. An apparatus for filtering options data, comprising:

a processor; and a storage device in communication with said processor and storing instructions adapted to be executed by said processor to:

receive options feed data including a first set of options feed data having a changed quote size;

identify, from said first set of options feed data, a plurality of distinct second sets of said options feed data, each of said plurality of said second sets of said options feed data meeting at least a first filter criteria, said at least first filter criteria including at least one previous quote size threshold and a change from a previous quote filter criteria associated with the at least one previous quote size threshold that is unique to each of said plurality of said second sets of said options feed data;

produce a filtered options feed by applying said at least first filter criteria to each of said plurality of said second sets of said options feed data; and disseminate said filtered options feed.

8. The apparatus of claim 7, further comprising a communication device, wherein said instructions adapted to be executed by said processor to disseminate said filtered options feed includes instructions to transmit said filtered options feed to a plurality of trading platforms.

9. The apparatus of claim 8, wherein said communication device receives said options feed data from at least one options feed source over a network connection.

10. The apparatus of claim 7, wherein said first set of options feed data includes options feed data having a change in quote size with no change in price.

11. The apparatus of claim 10, wherein said at change from a previous quote filter criteria includes at least one of one or more quote size increase thresholds and one or more quote size decrease thresholds.

12. The apparatus of claim 11, wherein said quote size decrease thresholds impose tighter filter controls than said quote size increase thresholds to filter fewer of said options fee data.

13. An options filtering system, comprising:

an options filtering system in communication with at least a first options feed data source producing options feed data including options quotes having a change in quote size to receive said options feed data, said options filtering system comprising a processor, and a storage device in communication with said processor and storing instructions adapted to be executed by said processor to:

identify, from said options feed data, a plurality of distinct subsets of said options feed data, each of said plurality of subsets of said options feed data meeting at least a first filter criteria, said at least first filter criteria including at least one previous quote size threshold and a change from a previous quote filter criteria associated with the at least one previous quote size threshold that is unique to each of said plurality of said second sets of said options feed data;

produce a filtered options feed by applying said at least first filter criteria to each of said plurality of said subsets of said options feed data; and at least a first trading platform in communication with said options filtering system to receive said filtered options feed.

14. The system of claim 13, wherein said options filtering system further comprises an administrator interface to receive changes in said at least first filter criteria.

15. The system of claim 13, wherein said at least one quote size threshold defines a change in quote size above which said subset of options feed data will be filtered.

16. The system of claim 13, wherein said at least one quote size threshold defines a change in size below which said subset of options feed data will be filtered.

17. The system of claim 13, wherein said change from a previous quote filter criteria includes at least one of one or more quote size increase thresholds and one or more size decrease thresholds.

* * * * *